UNITED STATES PATENT OFFICE.

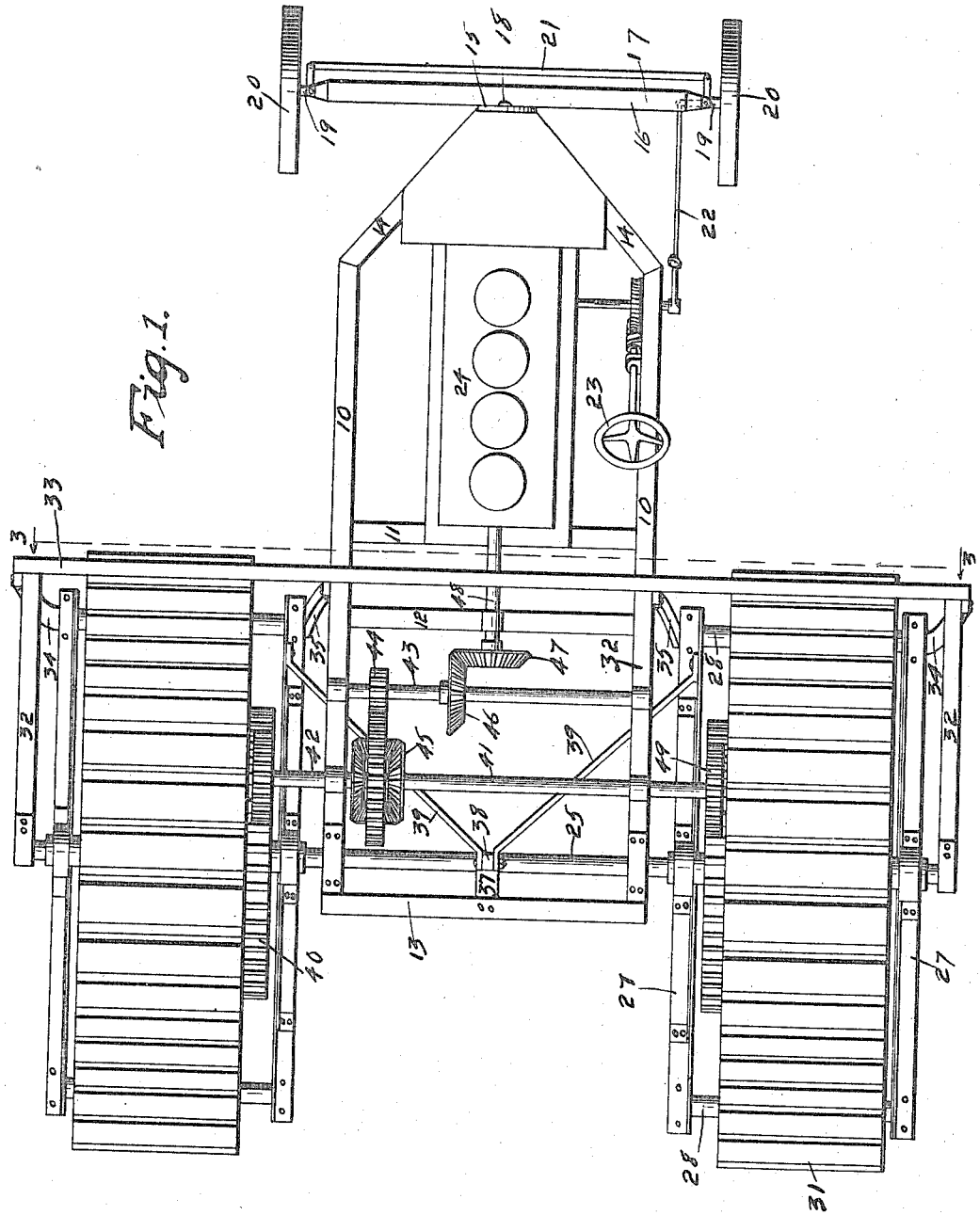

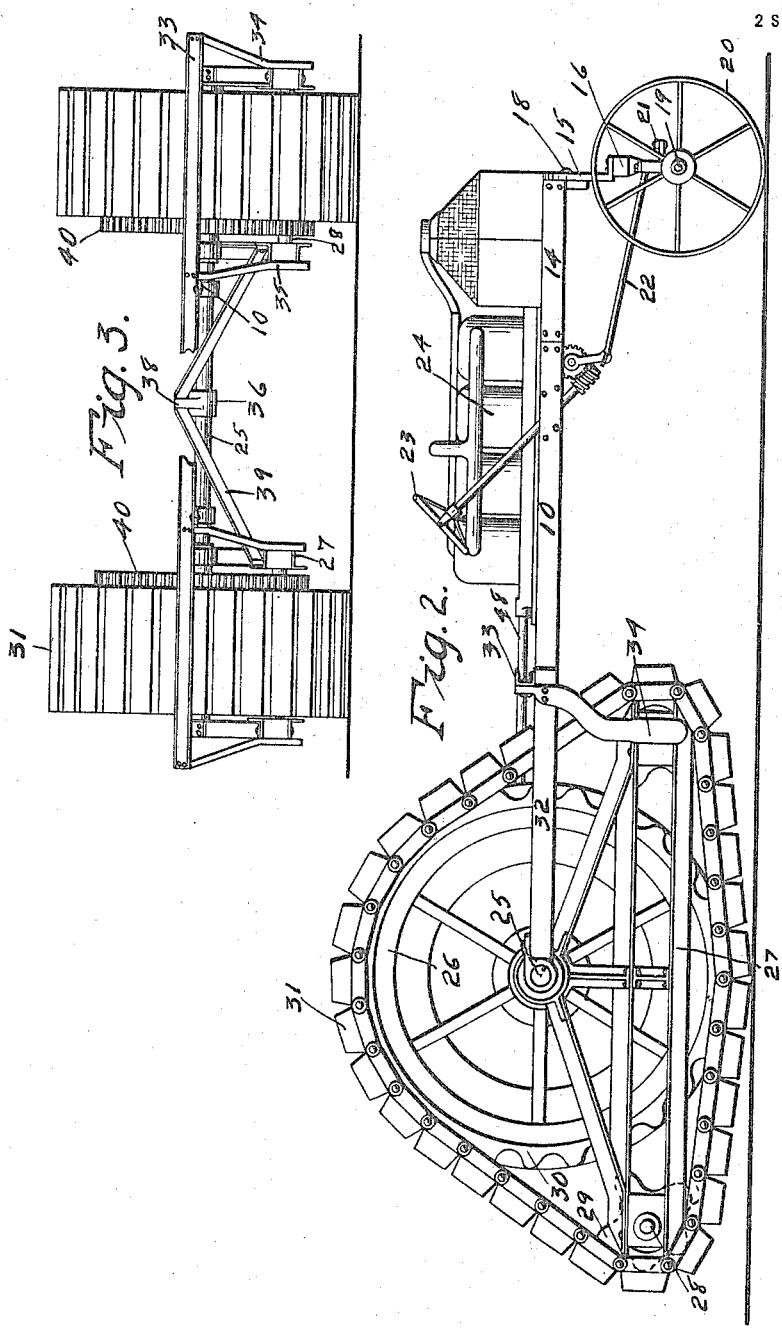

ARTHUR E. MILLER, OF NEWTON, IOWA, ASSIGNOR TO THE G. W. PARSONS COMPANY, OF NEWTON, IOWA.

CATERPILLAR-TRACTOR.

1,228,688.  Specification of Letters Patent.  Patented June 5, 1917.

Application filed August 31, 1914. Serial No. 859,541.

*To all whom it may concern:*

Be it known that I, ARTHUR E. MILLER, a citizen of the United States, and resident of Newton, in the county of Jasper and State of Iowa, have invented a certain new and useful Caterpillar-Tractor, of which the following is a specification.

The object of my invention is to provide a caterpillar tractor of simple, durable and inexpensive construction.

More particularly it is my object to provide a tractor of this kind, so constructed and arranged as to secure a three point suspension of the main frame and mechanism mounted thereon, and to so mount the frame on the rear axle as to permit a free tilting of the main frame on said rear axle.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a top or plan view of a caterpillar tractor, embodying my invention, and Fig. 2 shows a side elevation of the same.

Fig. 3 shows a transverse, sectional view, taken on the line 3—3 of Fig. 1.

Heretofore in the building of caterpillar tractors, one great objection to the use of the caterpillar wheel has been found in the difficulty of building a device so mounted on the frame as to be able to make turns with the device. Numerous expedients have been employed for producing a device in which the lateral twist on the caterpillar wheels could be eliminated. This is usually done by securing the frames which carry the parts of the caterpillar wheel rigidly to the main frame. Such a construction destroys the three point suspension of the main frame and the machinery mounted thereon and imparts a tremendous twisting strain to the parts while in service. Such a rigid connection of the small frames which carry the caterpillar wheel members with the main frame also prevents any tilting of the main frame with relation to the rear axle in some cases and generally prevents tilting of the main frame with relation to the caterpillar wheels, thereby largely destroying the effectiveness of the latter.

All of these difficulties I have avoided by my method of constructing and mounting my caterpillar tractor, one form of which is illustrated in the accompanying drawings.

In the accompanying drawings, I have used the reference numeral 10 to indicate the longitudinal parts of the main frame of the machine. The parts 10 are connected by transverse members 11, 12 and 13. At their forward ends the members 10 are secured to inwardly and forwardly inclined members 14 which are supported at their forward ends by a bracket 15 on a connecting device 16, which is mounted on the forward axle 17. The bracket 15 is connected with the members 14 by means of a bolt 18, which permits slight lateral tilting of the forward axle with relation to the main frame of the machine.

Connected with the forward axle are stub axles 19 on which are wheels 20. It will be understood that the stub axles are pivoted to move in horizontal planes so that the front wheels may be steered by ordinary steering mechanism used in motor cars and indicated generally the reference characters 21, 22 and 23. Mounted on the main frame of the machine is an engine 24. In the rear part of the machine is a transverse axle 25, on each end of which is mounted a large wheel 26, which is the large central wheel of the caterpillar. There is a caterpillar device at each end of the axle 25, comprising the large wheel 26 and the other parts now to be described.

Suitably mounted with relation to the axle 25 and to permit tilting with relation thereto, are smaller frames 27 which extend readwardly and forwardly from the wheel 26 below the level of the axle 25. Mounted in the forward ends of the frames 27 are short transverse shafts 28, on which are mounted sprockets or similar devices 29. The large wheels 26 are provided with some sort of sprocket device 30. An endless track 31 travels over the large wheel 26 and the sprockets 29. Mounted on the outer ends of the axle 25 are forwardly extending frame members 32 which are connected at their forward ends in front of the wheels 26 by means of a transverse frame member 33, preferably channel shaped, as shown in Fig. 2.

The member 33 is preferably secured to the members 10. Secured to the forward ends of the members 32 and to the respective outer ends of the member 33 are downwardly extending brace members 34, designed to engage the outer parts of the forward ends of the frames 27. Secured to the frame members 10 and to the frame member 33 are downwardly extending brace members 35, adapted to engage the inner parts of the forward ends of the inner frame members 27, as clearly illustrated in Fig. 1. The members 34 and 35 on each side of the machine serve to brace the frames 27 and the caterpillar devices for preventing lateral movement thereof without interfering with the tilting movement of the main frame and of the caterpillar devices with relation to the axle 25. Where desired, the members 34 and 35 may be dispensed with as is actually done in some forms of my device. The caterpillar frames may also be braced against lateral movement in the following manner.

Suitably mounted on the axle 25, preferably at the center thereof, is a collar 36. On the collar 36 is a rearwardly extending bracket or arm 37 which is secured to the rear frame member 13 whereby rotation and sliding movement of the collar on the shaft is prevented. The collar 36 is provided with a lug 38. Pivoted to the lug 38 are arms 39 extending forwardly and outwardly in the machine and pivoted to the inner parts of the frames 27 near their forward ends, as shown in Fig. 1. It will be seen that the arms 39 brace the frames 27 against lateral swinging movement while at the same time permitting free tilting movement of said caterpillar frames 27 with relation to the axle 25.

Formed or mounted on the wheels 26 are gears 40. Mounted on the frame members 10 are alined shaft members 41 and 42. A second transverse shaft 43 is mounted on the frame members 10 parallel with the shaft 41 and on said shaft 43 is mounted a gear 44. A differential gear 45 operatively connects the shaft members 41 and 42 with each other and with the gear 44. On the shaft 43 is a beveled gear 46 in mesh with the beveled gear 47 on the shaft 48 operated from the engine 24. On the shafts 41 and 42 are gears 49 which mesh with the respective gears 40.

It will be seen that insomuch as the main frame of the machine is capable of tilting movement with relation to the shaft 25, the shaft 41 is mounted to swing off the shaft 25 as a center, so that regardless of the tilted position of the main frame with relation to the caterpillar devices, the gears 49 will always be in mesh with the gears 40.

In the practical use of my improved caterpillar tractor, it will be seen that all the advantages of the three point suspension of the main frame are maintained. As hereinbefore referred to, one of the chief difficulties which has hitherto been faced by the manufacturers of caterpillar devices has arisen from the difficulty of securing a three point suspension and the consequent racking and straining of the frame of the machine.

The caterpillar construction has been found to have a large number of important advantages, especially in traveling over soft ground, on account of the broad supporting base of the caterpillar wheel and the large traction area which can be employed in advancing the traction device over the ground. The shape of the caterpillar wheel is generally such that it is relatively long and broad and relatively low. In making turns, the lateral strain and twist of the caterpillar wheel on the axle is tremendous and even in traveling straight forward the wheels tend to swing out of a direct line and to impose a great strain on the axle. When the small frames supporting the small wheels at each end of the caterpillar device are rigidly connected with the main frame of the machine, the lateral strain is somewhat done away with but any vertical tilting of the main frame with relation to the caterpillar or of the caterpillar with relation to the main frame imposes a severe up and down strain on the main frame of the machine.

Another disadvantage of such a rigid connection is found in the fact that ordinarily it is advantageous for the caterpillar device to be able to tilt vertically so as to always present a broad surface to the ground. This cannot always be done if the frame which supports the small wheels of the caterpillar is rigidly connected with the main frame of the machine.

It will readily be seen that where such a rigid connection is used, if the caterpillar should strike a stone and be raised from the ground, it could not tilt downwardly so that a portion of its endless track would grip the ground but would remain in the air over the stone until the stone was passed. Such a machine lacks the flexibility which is highly desirable in any traction device designed for travel over ordinary roads or over rough ground in the field.

With my device it will be noted that on account of the construction of the caterpillar device, the endless track 31 is inclined from its transverse middle line on its under surface upwardly and forwardly and upwardly and rearwardly. Such a construction assists in reducing the difficult lateral twist in making a turn. The method of mounting my caterpillar wheels on the axle and mounting the main frame on the front axle retains all the advantages of the three point suspension which are well known and gives a complete and proper flexibility to the machine while retaining all the advantages of the caterpillar tractor.

It will be understood that changes may be made in the details of the construction of such a device and in fact I have made my caterpillar tractor in a number of forms, including for instance, a large, heavy ditching machine and a lighter tractor for plowing orchards. It is, however, my intention to cover by this application any such changes of construction which retain the advantages of flexibility and three point suspension in combination with caterpillar wheels, which may be included within the scope of my claims.

I claim as my invention:

1. In a device of the class described, a frame, a supporting wheel mounted near one end of said frame to permit lateral tilting of the frame with relation to said wheel, an axle mounted on said frame near the other end thereof to permit vertical tilting of said frame, caterpillar traction devices mounted on the ends of said axle and vertically tiltable at all times with relation thereto, a source of power on said frame, gearing devices for imparting motion from said source of power to said caterpillar traction devices in all positions of the tilting movement of said main frame with relation to said axle, and guide devices on said frame for engaging said caterpillar devices and preventing the lateral swinging movement thereof, without interfering with the tilting movement of said caterpillar devices.

2. In a device of the class described, a frame, a supporting wheel mounted near one end of said frame to permit lateral tilting of the frame with relation to said wheel, an axle mounted on said frame near the other end thereof to permit vertical tilting of said frame, caterpillar traction devices mounted on the ends of said axle and vertically tiltable with relation thereto, each of said caterpillar traction devices including a large wheel mounted on the axle, a smaller frame mounted on the axle and extending forwardly and rearwardly from said large wheel, small wheels mounted in the ends of said smaller frame in front and in rear of said large wheel, and an endless track traveling over the wheels of each caterpillar traction wheel.

3. In a device of the class described, a frame, a supporting wheel mounted near one end of said frame to permit lateral tilting of the frame with relation to said wheel, an axle mounted on said frame near the other end thereof to permit vertical tilting of said frame, caterpillar traction devices mounted on the ends of said axle and vertically tiltable with relation thereto, each of said caterpillar traction devices including a large wheel mounted on the axle, a smaller frame mounted on the axle and extending forwardly and rearwardly from said large wheel, small wheels mounted in the ends of said smaller frame in front and in rear of said large wheel, and an endless track traveling over the wheels of each caterpillar traction device, said smaller wheels being below the level of said axle and the lower peripheries of said smaller wheels being above the level of the lower part of said large wheel, so that said endless track is slightly inclined from its lower point below the large wheel upwardly and forwardly, and rearwardly and upwardly, when the device is in normal position.

4. In a device of the class described, a frame, a supporting wheel mounted near one end of said frame to permit lateral tilting of the frame with relation to said wheel, an axle mounted on said frame near the other end thereof to permit vertical tilting of said frame, caterpillar traction wheels mounted on the ends of said axle and vertically tiltable with relation thereto, each of said caterpillar traction wheels including a large wheel mounted on the axle, a smaller frame mounted on the axle and extending forwardly and rearwardly from said large wheel, small wheels mounted in the ends of said smaller frame in front and in rear of said large wheel, an endless track traveling over the wheels of each caterpillar traction wheel, and means for engaging said smaller frame for preventing the caterpillar traction wheels from swinging laterally with relation to the main frame and for thereby reducing the twisting strain on the axle, said means being so constructed as not to interfere with the three point suspension of the main frame.

5. In a device of the class described, a frame, a supporting wheel mounted near one end of said frame to permit lateral tilting of the frame with relation to said wheel, an axle mounted on said frame near the other end thereof to permit vertical tilting of said frame, caterpillar traction wheels mounted on the ends of said axle and vertically tiltable with relation thereto, each of said caterpillar traction wheels including a large wheel mounted on the axle, a smaller frame suitably mounted on the axle and extending forwardly and rearwardly from said large wheel, small wheels mounted in the ends of said smaller frame in front and in rear of said large wheel, an endless track traveling over the wheels of said caterpillar traction wheel, a collar mounted on said axle to permit the rotation of said axle within said collar, means for securing said collar to the main frame, and means for securing said collar to said smaller frames for preventing the lateral movement of said smaller frames and permitting vertical tilting movement thereof.

6. In a device of the class described, the combination with a frame, wheeled means engaging said frame at a single point of suspension at one end, an axle extending transversely of the opposite end of said frame and upon which said frame is supported, caterpillar traction devices mounted upon the outer ends of said axle, each of said devices comprising a large traction wheel journaled upon said axle, a substantially triangular frame hung upon said axle and extending forwardly and rearwardly thereof, smaller wheels journaled in the opposite ends of said frame, and an endless track passing over the wheels of each frame, said frames being free to tilt vertically upon said axle.

7. In a device of the class described, a frame, a supporting wheel mounted near one end of said frame to permit lateral tilting of the frame with relation to said wheel, an axle mounted on said frame near the other end thereof to permit vertical tilting of said frame, caterpillar traction devices mounted on the ends of said axle and vertically tiltable at all times with relation thereto, said caterpillar traction devices each having a frame and movable members, a brace connected with each of said last named frames and extending toward the central portion of said axle and pivotally mounted on said axle, a source of power on said frame, gearing devices for imparting motion from said source of power to said caterpillar traction devices in all positions of the tilting movement of said main frame with relation to said axle.

Des Moines, Iowa, August 8, 1914.

ARTHUR E. MILLER.

Witnesses:
NELLE TRUITT,
W. N. KEISER.

Copies of this patent may be obtained for five cents each, by addressing the "Commissioner of Patents, Washington, D. C."